United States Patent [19]
Barns-Slavin et al.

[11] Patent Number: 5,117,364
[45] Date of Patent: May 26, 1992

[54] CARRIER MANAGEMENT METHOD AND SYSTEM HAVING AUTO-RATE SHOPPING

[76] Inventors: Ileana D. Barns-Slavin, 64 Old Hwy., Wilton, Conn. 06897; Alonzo T. Dukes, 220 Red Oak Rd., Bridgeport, Conn. 06606; Angela Njo, 495 Vincellette St., Apt. 211, Bridgeport, Conn. 06606; David J. Taylor, 23 Ludlow Manor, Norwalk, Conn. 06855

[21] Appl. No.: 487,085

[22] Filed: Mar. 2, 1990

[51] Int. Cl.⁵ .............................................. G07B 17/02
[52] U.S. Cl. .............................. 364/464.03; 177/25.15
[58] Field of Search ................. 364/464.03; 177/25.15

[56] References Cited

U.S. PATENT DOCUMENTS

| | | | |
|---|---|---|---|
| 4,325,440 | 4/1982 | Crowley et al. | 177/25.15 |
| 4,420,819 | 12/1983 | Price et al. | 364/900 |
| 4,495,581 | 1/1985 | Piccione | 364/464.03 |
| 4,595,984 | 6/1986 | Daniels | 364/466 |
| 4,713,761 | 12/1987 | Sharpe et al. | 902/37 X |
| 4,839,813 | 6/1989 | Hills et al. | 364/464.03 |
| 4,872,119 | 10/1989 | Kajimoto | 364/464.03 |

*Primary Examiner*—Parshotam S. Lall
*Assistant Examiner*—Edward R. Cosimano
*Attorney, Agent, or Firm*—Robert H. Whisker; Melvin J. Scolnick; David E. Pitchenik

[57] ABSTRACT

A carrier management system includes a scale for weighing parcels to be shipped, a computer connected to receive data from the scale related to the weight of a parcel thereon, and first input keys enabling the input of information. The computer has a data base for storing shipping charge data for a plurality of carriers and/or shipping classes, based upon the weight of a parcel of the scale. The computer is responsive to the operation of the first keys for determining shipping charges for predetermined carriers and/or shipping classes represented by data in the data base. The input includes auto-rate selection key, and the computer is responsive to operation of the auto-rate selection key for determining shipping charges of the least costly carrier and/or shipping class of a predetermined subgroup of carriers and/or shipping classes represented by data in the data base. In one operating mode, the computer may determined the next least costly shipping charges. The computer is responsive to the operation of determined keys of the input means for controlling the carriers and/or shipping classes within the subgroup, as well as for controlling the operating mode thereof.

6 Claims, 6 Drawing Sheets

CARRIER MANAGEMENT METHOD AND SYSTEM HAVING AUTO-RATE SHOPPING

FIELD OF THE INVENTION

This invention relates to carrier management systems, and is more in particular directed to the provision of such a method and system facilitating the selection of a carrier or class of service for the shipment of parcels.

BACKGROUND OF THE INVENTION

In the shipping of parcels, it is frequently desirable to make provision for shipping by more than one carrier. In current shipping practice, provision must be made for the shipping of parcels by two major carriers, such as the United States Postal System (USPS) and the United Parcel Service (UPS), a private carrier, as well as any of a large number of smaller private carriers. In prior tracking or recording systems, various data concerning parcels or groups of parcels to be shipped were entered by an operator, so that the information could be stored in the records of a memory. The "transactions" recorded included information relating to the shipment, such as, for example, the identification of the carrier, the number of packages in the shipment, the weight, address data, charges, date and time, invoice number, etc. Factors such as weight were entered either manually or automatically by a scale, while other factors such as zip code were generally entered by an operator by way of a keyboard. Such systems contemplated the provision in the programs of routines that determined shipping costs on the basis of the information that was input.

Systems of this type are disclosed, for example, in U.S. Pat. Nos. 4,325,440; 4,495,581 and 4,595,984. The prior art does not, however, disclose a system wherein a simple and programmable arrangement is provided enabling an operator to readily select the least costly or otherwise optimum carrier for a given shipment.

SUMMARY OF THE INVENTION

The invention is directed to the provision of means for simplifying the operation of carrier management systems, i.e., systems for processing the shipment of parcels or the like via one or more carriers.

In accordance with the invention, a carrier management system includes a scale for weighing parcels to be shipped, a computer connected to receive data from the scale related to the weight of a parcel thereon, and input means enabling an operator to input information to the computer. The input means includes a plurality of keys including separate first input selection keys. The computer has a data base for storing shipping charge data for a plurality of carriers and/or shipping classes, based upon the weight of a parcel of the scale. The computer comprises means responsive to the operation of the first keys for determining shipping charges for predetermined carriers and/or shipping classes represented by data in the data base. In accordance with the invention, the input means comprises an auto-rate selection key, and the computer comprises means responsive to operation of the auto-rate selection key for determining shipping charges of the least costly carrier and/or shipping class of a predetermined subgroup of carriers and/or shipping classes represented by data in the data base.

In a further feature of the invention, the computer comprises means responsive to the depression of a determined key on the input means for determining the shipping charges for the next least costly carrier and/or shipping class of the subgroup.

In a further feature of the invention, the carrier management system further comprises a display connected to the computer, and the computer comprises means responsive to operation of the auto-rate selection key for displaying the weight of a parcel on the scale, and the shipping charges for the parcel for the least costly carrier and/or shipping class, on the display.

The carrier management system may also include printing means connected to the computer, for printing parcel shipping information. The computer comprises means responsive to the operation of a further key on the input means, following the operation of the auto-rate selection key, for controlling the printer to print parcel shipping information.

The computer further comprises means responsive to the operation of determined keys of the input means for controlling the carriers and/or shipping classes within the subgroup.

The system has a first mode wherein the computer comprises means responsive to the operation of the auto-rate selection key for permitting the determination only of the shipping charges of the least costly of the carriers and/or shipping classes of the subgroup, and a scroll mode wherein the computer comprises means responsive to the operation of the auto-rate selection key followed by operation of a further key for determining the next least costly shipping charge of the carriers and/or shipping classes of the subgroup. The computer includes means responsive to operation of determined keys of the input means for selectively controlling the computer to operate in the first mode or the scroll mode.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
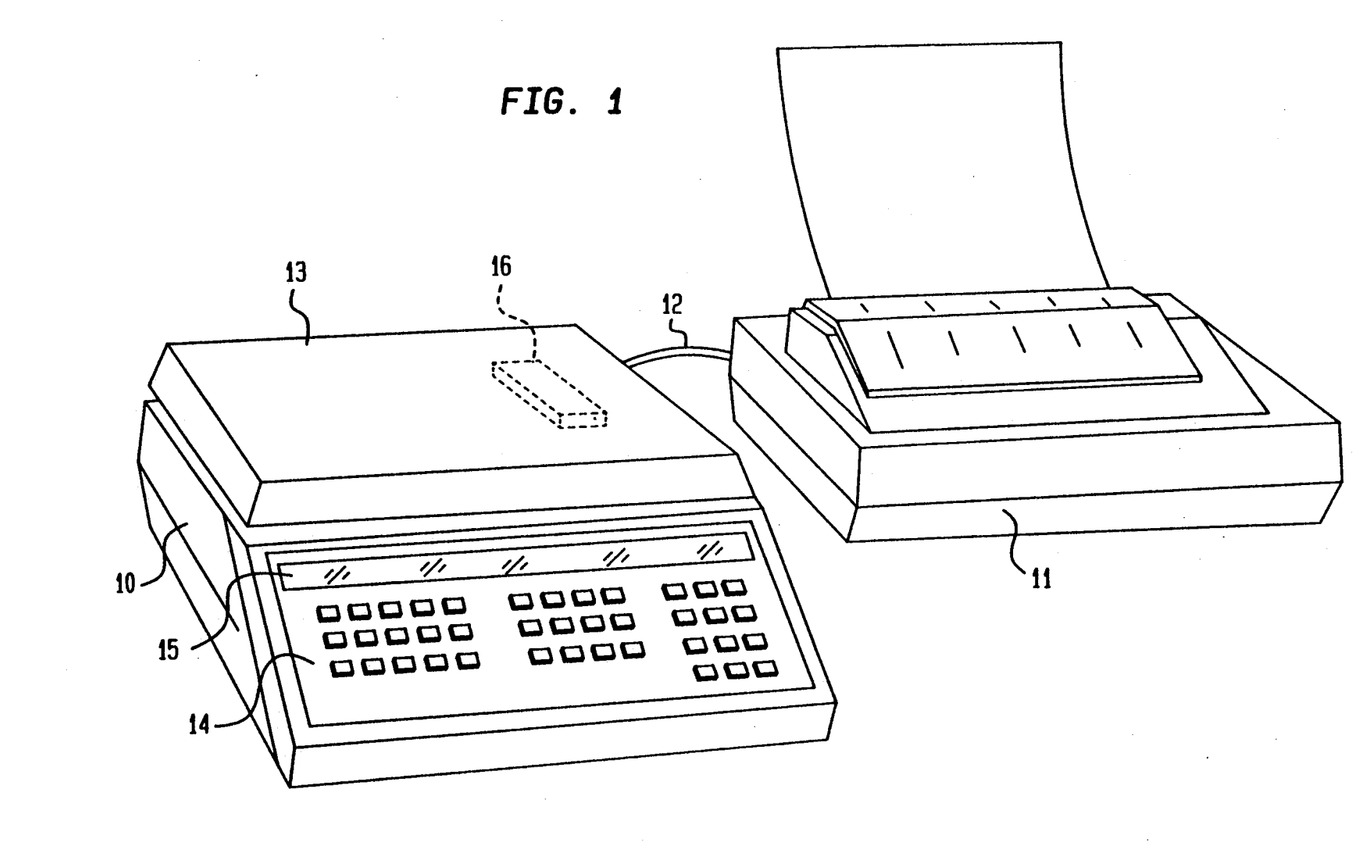
FIG. 1 is a perspective illustration of a carrier management system that may incorporate the present invention.

Referring now to the drawings, FIG. 1 is a perspective view of a carrier management system that may be employed in the present invention, including a console 10 and an optional printer 11 coupled thereto via cable 12. The console supports a platform 13 for receiving parcels to be weighed. The front panel of the console includes a keyboard 14 and a display 15. A replaceable board 16, illustrated in dashed lines, is mounted on or in the console below the platform, this board 16 having one or more ROM's or PROM's thereon. These ROM's store data that may be unique to the user of the system, are replaceable by other ROM boards in order, for example, to enable a serviceman to gain access to critical setup programs stored in other NVM in the console.

Figure 2:
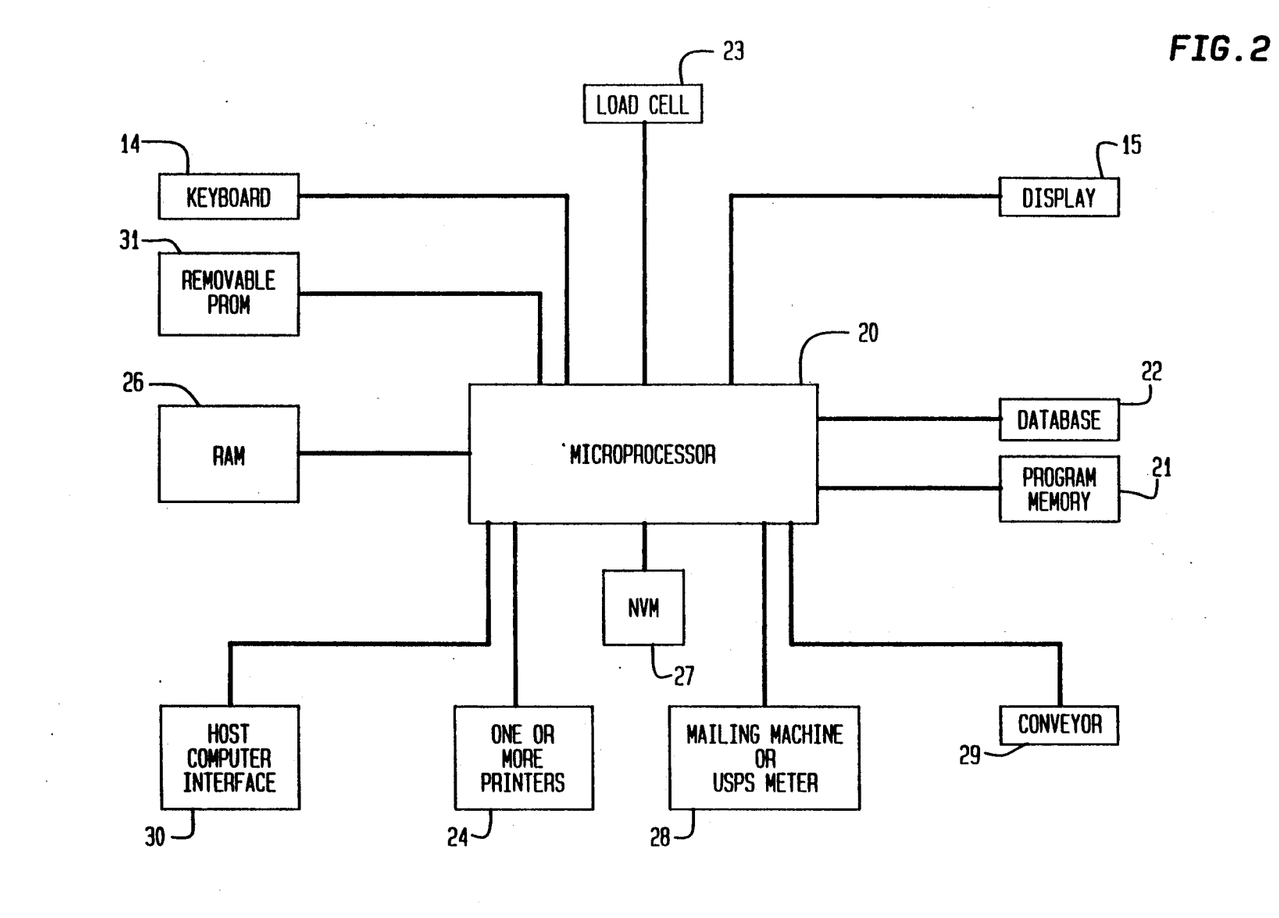
FIG. 2 is a block diagram of the system of FIG. 1.

FIG. 2 is a block diagram of the carrier management system of FIG. 1. The system incorporates a microcomputer including a microprocessor 20 having a nonvolatile program memory 21 containing the program for operation of the system, and a non-volatile database memory 22 having stored therein rate information of all carriers for which the system is expected to determine cost data. This latter memory is preferably replaceable in order to be able to update rate information, change or add carriers and/or classes of service, etc. A load cell 23 coupled to the platform applies data to the microprocessor related to the weight of a parcel on the platform.

The system further includes one or more printers 24, one of which may be the printer 11 illustrated in FIG. 1, and another of which may be internal to the system, if desired. The system may have working RAM 26, and further NVM 27, and may be adapted to be connected to a mailing machine or USPS meter 28, a conveyor 29, and/or a host computer interface 30.

The system in accordance with the invention is adapted to determine mailing or shipping charges for a parcel placed on the platform 13, and may be adapted to print a manifest, label, tag, etc. related to the shipping of the parcel, and/or it may include internal registers for accounting for the shipping of such parcels.

Figure 3:
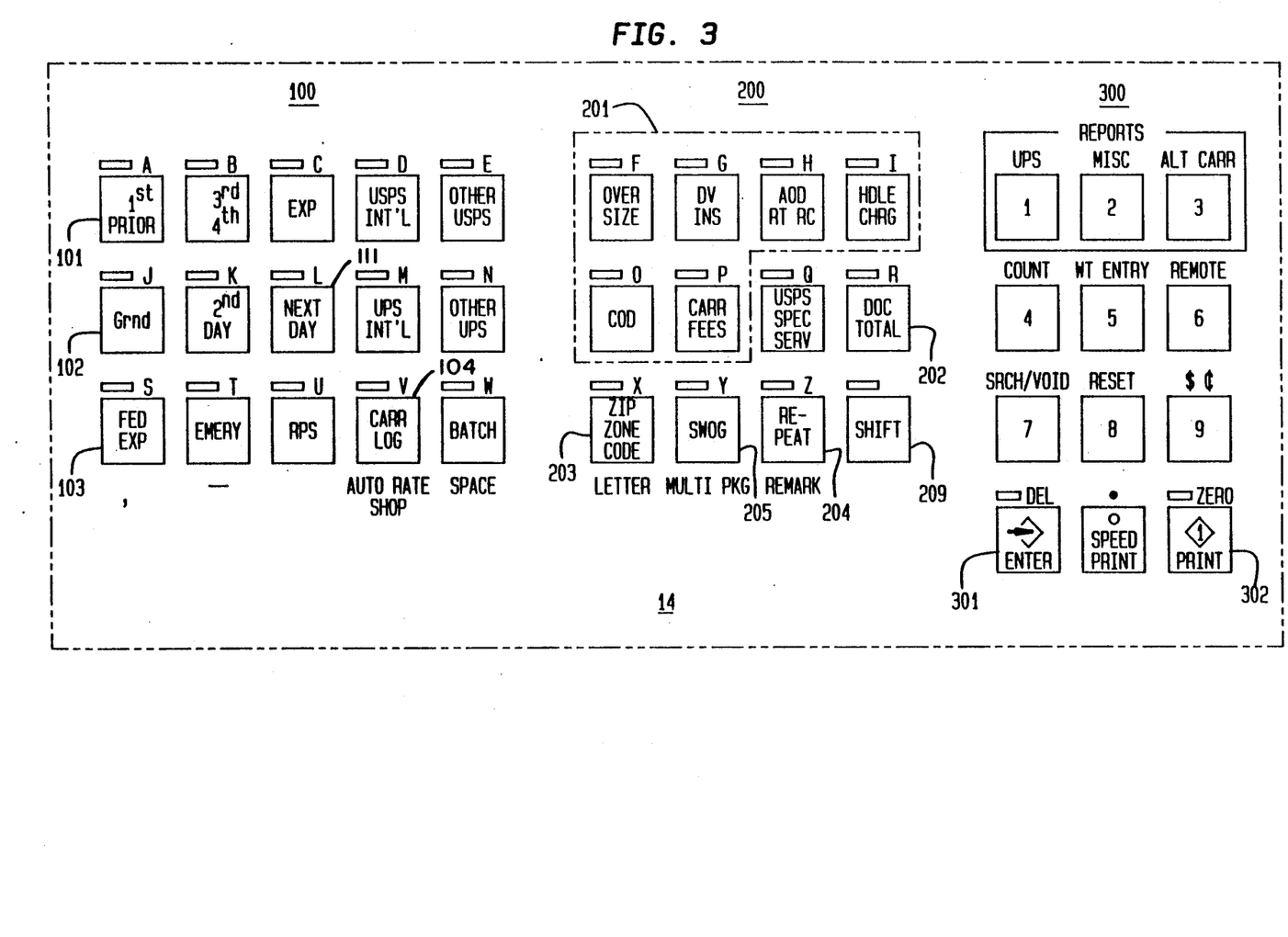
FIG. 3 is an illustration of the keyboard of the system of FIG. 1.

Referring now to FIG. 3, therein is illustrated the keyboard 14 of a preferred carrier management shipping system in accordance with the invention. The keyboard includes three sets 100, 200, 300 of keys. Each of the keys has a label printed thereon corresponding to the primary function of the key. Secondary and tertiary functions are printed above and below the keys showing additional functions that depression of the associated the keys may enable.

The group 100 of keys includes three rows 101, 102, 103 of keys, each row having five keys. These keys are known as the carrier/class keys, since their primary function is concerned with the selection of the carrier to use for shipping a given parcel, or the class of shipment that is to be employed for the shipment. For example, the keys of the first row 101 may be concerned with shipments by the USPS, and depression of any of these keys automatically selects shipping via USPS, with the specific class being determined by the key in the row that is depressed. Thus, depression of the first key in the row indicates that calculations should be made on the basis of first class or priority class mailing. These calculations are based upon the weight of the parcel. If priority class is to be selected, by the depression of this key, a response will be made to a later prompt for an input of the zip or zone of destination. Similarly, depression of the second key selects third or fourth class mail, depression of the third key selects express mail, depression of the fourth key selects USPS international mail, and depression of the fifth key in the row selects other classes, the specific selection of other classes being in response to prompts on the display.

Depression of a key of the second row 102 of keys automatically selects UPS as the carrier, with the various keys of this row hence being directed to various classes of shipping via UPS.

In the third row 103 of keys, the first three keys are directed to the shipping costs of a group of carriers, such as Federal Express, Purolator, DHL, Emery, etc., so that depression of the corresponding key enables the system to determine the shipping charges, for the current parcel, of each of these carriers. Various shipping classes may also be analyzed in response to the depression of these keys, such as, for example, drop shipments.

The fourth key in the row 103 enables the user to select infrequently used carriers and/or classes from a menu that appears on the display. Such selection may require the user to calculate the shipping charges, since the rates for these carriers and/or classes may not be stored in the system.

Selection of the last key in the row 103 enables the user to process a group of parcels as a single transaction.

The second group 200 of keys includes a group 201 of toggle keys enabling the user to select or deselect special services. These keys may include, for example, a key for oversize parcels to require shipping charge determination to be also based upon the size of the parcel, a key requiring addition of insurance charges, a key including charges for a return receipt, a key for COD shipments, a key to call a menu for special services for alternate carriers, etc.

In addition, this group 200 of keys includes a key 202 to effect printing of accumulated values for a group of parcels, a key 203 to change the zip or zone identification, a key 204 to repeat the data of the previous transaction and a key 205 to process the parcel for shipment with other goods. In addition, the group 200 includes the SHIFT key 209 which enables selection of second and third functions of various ones of the other keys.

The third group 300 of keys enables numeric entry by the user, in response to prompts for such entries from the display, and also includes an ENTER keypad 301 for enabling entering of certain responses, and a PRINT key 302 for causing the printing of the manifest, label, tape, and/or the entering of data into internal registers, etc.

Most of the keys also have a second function printed above the key, the second function being effected upon depression of the SHIFT key 209 and the respective key. In addition, a third function is printed below a number of the keys, the third function being effected by depression of this key along with the SHIFT key (only in the event that depression of the key for effecting the second function would have not have resulted in a valid entry). If depression of a key for performing a primary function would have been invalid, such depression causes the selection of the second function, without depression of the SHIFT key, if the respective second function constitutes a valid response to a prompt at that time.

As is apparent in FIG. 3, the second functions of a number of the keys correspond to the letters A-Z. The second functions of the keys of the first row of the group 300, however, are commands for the printing of various reports, such as UPS, a miscellaneous carrier, or a carrier to be selected from a menu. The first key in the second row of group 300 may direct the system to count parcels of the same weight, the second key in this row may enable manual entry of the weight, and the third key in this row allows entry of weight from a remote scale.

As illustrated, only a few of the keys serve third functions. Other keys permit entry of various punctuation, and a space.

Figure 4:
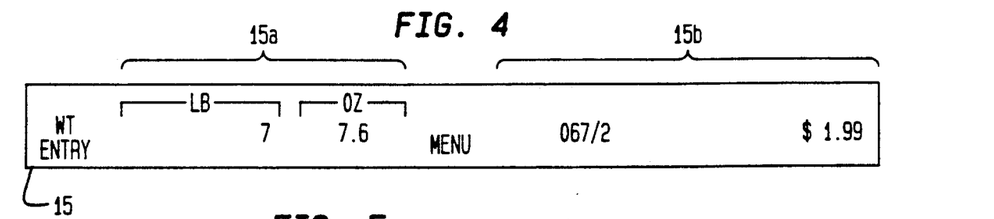
FIG. 4 is an illustration of the display of the system of FIG. 1.

FIG. 4 illustrates a display 15 that may be employed in the carrier management system of the invention. As illustrated, the display includes a section 15a that displays the weight of a parcel on the platform, for example in pounds and ounces. The other portion 15b of the display is employed for various alphanumeric messages. These messages may include various menus and lists of choices (that may be scrolled by the user), responses given by the user such as the zip code and zone messages shown in the figure, as well as prompts, etc., as well as, at the right end of the portion 15b, the shipment cost that has been calculated by the system.

In use of the above described system, i.e. not considering the specific features of the present invention, a parcel is placed upon the platform 13, and, in response thereto, a message is displayed prompting the user to enter an identification number of the parcel. When an identification number has been entered, the user may be optionally prompted to enter user definable, customer related information associated with the parcel to be shipped, as well as remarks concerning the parcel. Next the user is prompted to enter a carrier/class selection. In response thereto, the user depresses one of the keys of row 101 of keyboard section 100, if the parcel is to be shipped by USPS, or one of the keys of row 102 of keyboard section 100 if the parcel is to be shipped by UPS. The separate keys of these two rows correspond to different classes of service. Some of these keys may correspond to more than one class of service, in which case a menu is displayed and scrolled on the display to permit the operator to select the desired class of service. For example, the first key in row 101 may enable the user to select either first class or priority USPS mail service, and the second key in this row may enable the user to select either third or fourth class USPS mail service. Following this selection, the user is prompted to enter the Zip code, in response to which the user enters a 3 digit Zip code (i.e. the most significant 3 digits of the Zip code). The system now displays the weight of the parcel at the section 15a of the display, the 3 digit Zip code and Zone at the section 15b of the display, and the shipping charges at the section 15b of the display.

If desired, the user may now depress one or more of the special charge keys in the section 201 of the keyboard. For example, if the parcel is oversize, the first key in the first row of this section is depressed, following which the display shows the additional charges for an oversize parcel. After a predetermined time, the display will show the total charges for shipping the parcel including the oversize parcel charges. The other special charge keys function in a similar manner to add charges for other special services.

At this time, if the user is satisfied with the entries that have been made, the print key 302 is depressed and the parcel is removed from the platform, to complete the transaction. The system now proceeds to print any desired documents, tags, tapes or labels, and, if the program requires, to perform any necessary accounting functions.

AUTO-RATE SHOPPING

In view of the many carriers and classes available for shipping parcels, it is frequently desirable to be able to readily determine the least expensive carrier and/or class for shipping a given parcel. In view of the many possible combinations, it is also not generally feasible to provide dedicated entry keys for each of the many carriers and class that are available, and the system may hence employ the Carrier Log key 104, e.g. the fourth key in the row 103, to call a menu that can be scrolled to enable access to charges for all other carriers and classes that are programmed in the data base.

It is frequently desirable, however, to be able to automatically determine in a simple manner the least expensive carrier/class for shipping a given parcel in a simple manner. For this purpose, an AUTO-RATE SHOPPING feature is provided, that may be accessed by depressing the SHIFT key 209 and the CARR LOG key 104 at the same time. When AUTO-RATE SHOPPING is enabled, depression of any of the keys shown in the series 100 keys, except for the "v" and "w" key, accesses a programmed respective list of a predetermined number (e.g. 5) of carriers and/or classes, to automatically select the least expensive of the carriers and or classes in the list for shipping the parcel.

Each AUTO-RATE SHOPPING list is programmed to have a primary carrier and/or class by which it is identified, and one or more secondary carriers and/or classes. For example only, key 111 may be programmed to access a list including UPS Next Day service as a primary carrier/class, with USPS Express service, Emery/Purolator Next Morning Delivery, DHL Express Package service and Airborne Express Package service being programmed as secondary carrier classes. Upon entering the AUTO-RATE SHOPPING mode and depressing key 111 in response to the Carrier/Class prompt, the system will determine which of the carrier/classes of this list provides the least expensive service.

AUTO-RATE SHOPPING in accordance with the invention may be effected in either of two modes, i.e. an AUTO mode and a SCROLL mode. As will be discussed, the system may be programmed by the user to operate in either one of these modes. In the AUTO mode, the system determines the least expensive carrier/class for the given parcel and displays the identification of this carrier/class, and causes the system to consider only that carrier/class in subsequent determinations for the given transaction (i.e. for shipping the parcel currently on the platform). In the SCROLL mode, the system initially determines and displays the identification of the least expensive carrier/class. If the user is not satisfied with this selection, the enter keypad 301 is depressed and the system then displays the next least expensive carrier/class. The remainder of the chosen carrier/class list may be scrolled in the same manner, until the user is satisfied with the selection. Any carrier/class in the list that has a invalid zip code is removed from the list. At such time, the user proceeds to select any desired special services, and to terminate the transaction by depressing the PRINT key 302.

Figure 5:
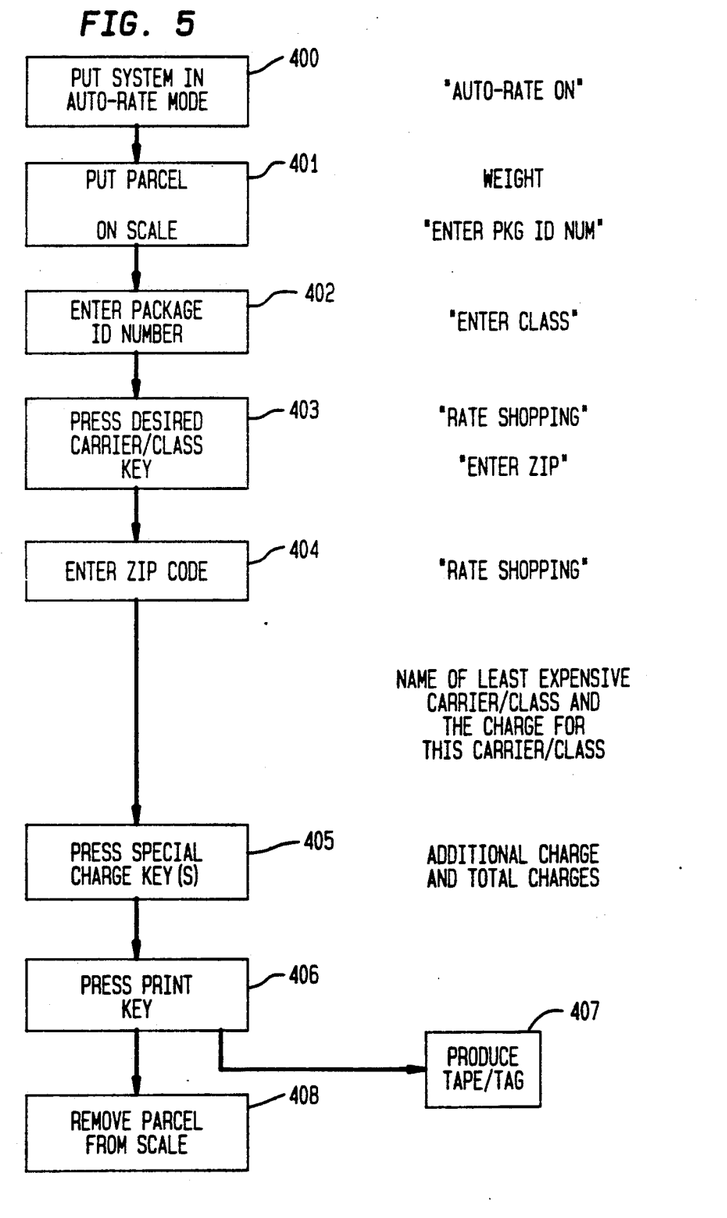
FIG. 5 is a flow diagram illustrating the AUTO mode of AUTO-RATE SHOPPING in accordance with the invention.

FIG. 5 illustrates a procedure that may be employed, in accordance with the invention for using AUTO-RATE SHOPPING in the AUTO mode. Initially, there must be no weight on the platform, then, at block 400, the system is placed in the AUTO-RATE SHOPPING mode by simultaneous depressing the SHIFT key 209 and the CARR LOG key 104. At this time the display shows AUTO-RATE SHOP. The user now places the parcel to be shipped on the platform, at block 401. The display now shows the weight of the parcel, and the prompt ENTER PKG ID NUM. Upon entry of the parcel identification number, at block 402, the user may be prompted to enter customer data and remarks (not illustrated), following which the user is prompted to ENTER CLASS. The user now, at block 403, depresses any one of the keys in the series 100 except for the "v" and "w" key, for the selection of the desired AUTO- RATE SHOPPING list. The user is next prompted to ENTER ZIP, and, upon the entry of the Zip code at block 404, the system initially displays RATE SHOPPING.

After calculating the least expensive carrier/class, based upon the weight of the parcel, the destination Zip code, and the rate data stored in the system, the system displays the identification of this carrier class, and the charges therefor. The procedure now is the same as for conventional shipping as above discussed. Thus, if the user desires any special services, the corresponding keys are depressed at block 405, and the PRINT key 302 is depressed at block 406 to complete the transaction. The system now prints any tapes, tags, manifests, etc., in accordance with the program, at block 407. The user now removes the parcel from the platform, at block 408, preparatory for receiving the next parcel. If the next parcel is to employ AUTO-RATE SHOPPING, the procedure reverts to block 401. If, however, the user no longer desires to use the AUTO-RATE SHOPPING feature, the feature is toggled off by again depressing the SHIFT key at the same time as the CARR LOG key.

Figure 6:
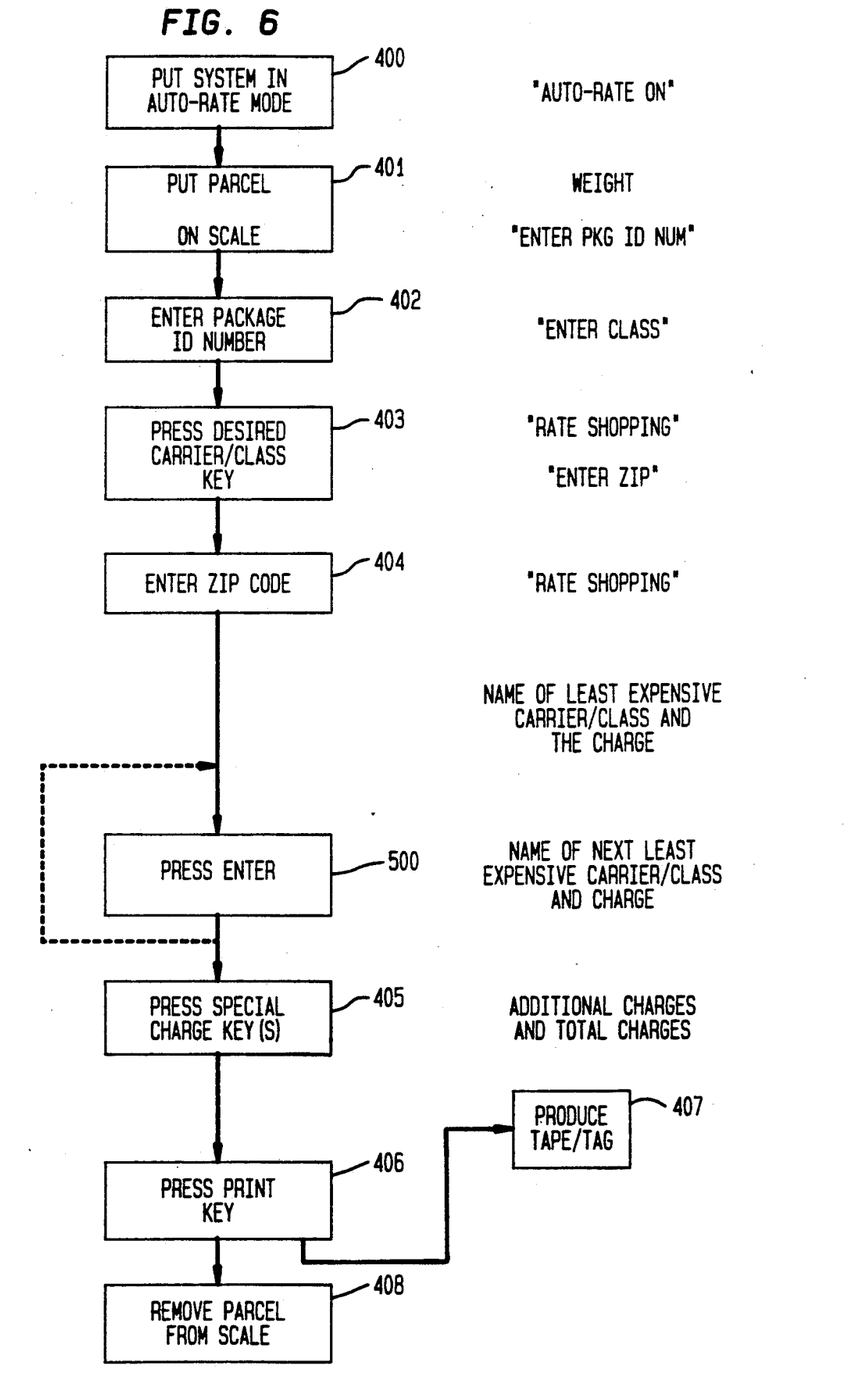
FIG. 6 is a flow diagram illustrating the SCROLL mode of AUTO-RATE SHOPPING in accordance with the invention.

When AUTO-RATE SHOPPING is employed in the SCROLL mode, as illustrated in FIG. 6, the same procedure is followed as above discussed, through block 404. If, for example, in the judgment of the user, the carrier/class now displayed as the least expensive carrier/class is not suitable for the shipment of the current parcel, the ENTER key 301 is depressed, at block 500, and the system now displays the next least expensive coarrier/class and the charges therefor. This step may be repeated as many times as desired, to enable the user to scroll through the entire list, and thence to repeat the list, if desired. Once the displayed selection is considered to be satisfactory, the remainder of the procedure follows that above described with reference to FIG. 5.

In either of the above discussed AUTO-RATE SHOPPING modes, it is apparent of course that the carrier/classes on the respective lists must be those for which rate data has been stored in the system. The data base may store rate tables for each of the carrier/classes, of the charges therefor, based upon the parcel weight and destination Zip code. Accordingly, in the AUTO-RATE SHOPPING program in accordance with the invention, it is merely necessary to scan the respective carrier/classes of the list to locate the one having the minimum charge, or, in the SCROLL mode, to find the carrier/class having a charge that is the next least as compared with the displayed carrier/class. For example, the various carrier/classes of a list, along with the parcel weight and Zip code, may correspond to addresses of separate tables, the program thereby scanning the respective addresses and initially selecting the carrier/class having the lowest stored value. In the SCROLL mode, the program may scan the tables to locate the stored value that is the next lowest, as compared to the currently selected value.

Figure 7:
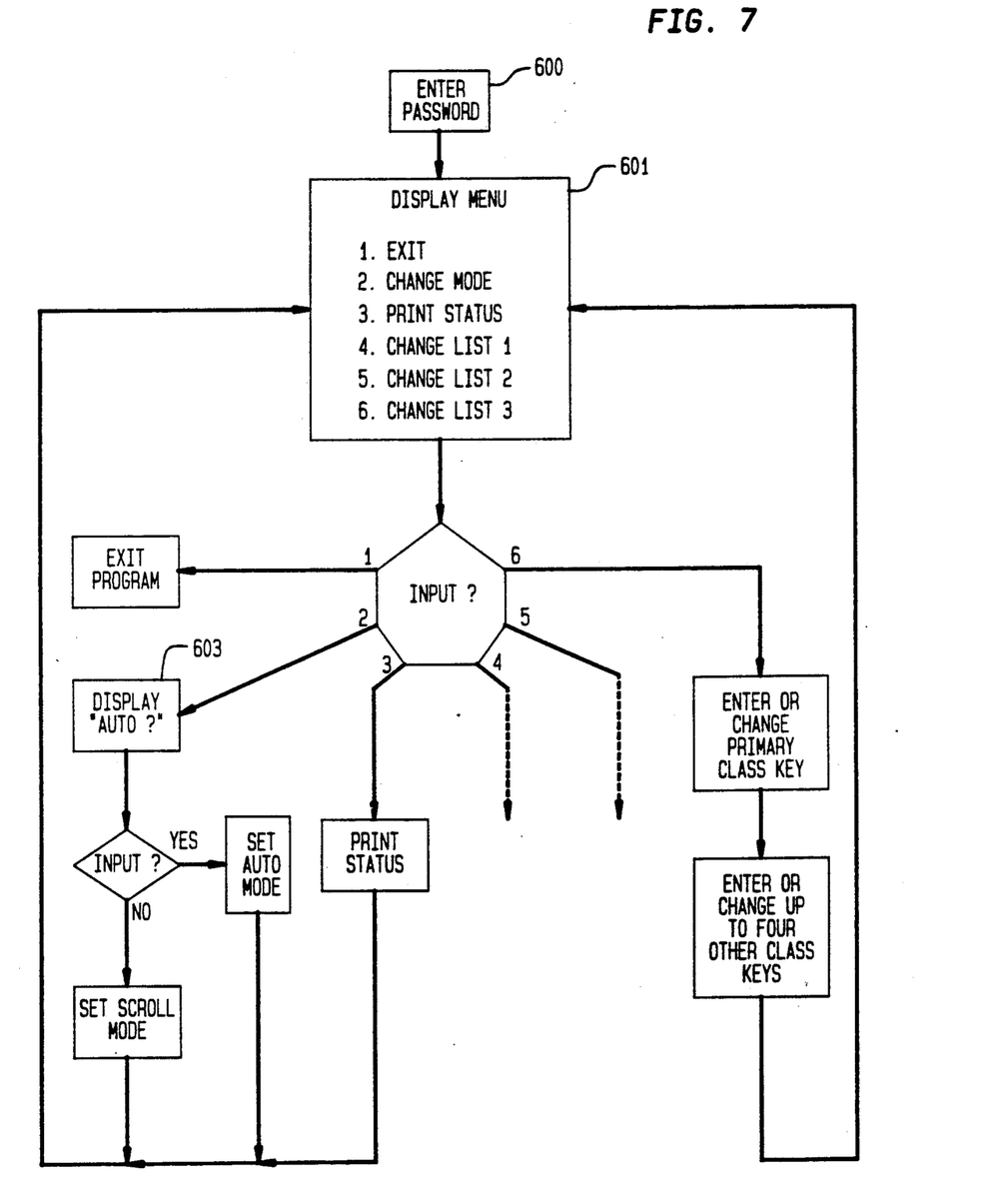
FIG. 7 is a flow diagram illustrating programming of the system of the invention for AUTO-RATE SHOPPING.

FIG. 7 is a flow diagram of a program that may be employed to enable the user to set up a system for AUTO-RATE SHOPPING. Initially, in order to avoid the setup program from being used by unauthorized personnel, the user enters a predetermined password into the system via the keyboard, as indicated at block 600. The entry of the password invokes the setup program, which initially displays a menu as shown at block 601. Since the display 15 has a minimum size, the menu may be presented a single line at a time, with lines thereof being scrolled in response to depression of the ENTER key 301.

As illustrated, choice 2 of the menu, called by depression of the numeric "2" key causes the display of the prompt AUTO?, at block 603. In order to invoke the AUTO mode, the user depresses the Y key 205. This response controls the program to install the necessary subroutines for the AUTO mode. If, on the other hand, the SCROLL mode is desired, the user depresses the N key, to install the SCROLL subroutines. Each of these responses returns the program to the menu for further setup.

Choices 4, 5 and 6 of the menu permit the user to enter or change the AUTO-RATE SHOPPING carrier/class lists that are called by any of the keys in series 100 except the "v" or "w" keys. For example, if choice 6 is selected, the user is prompted first to change (or enter) the primary carrier/class. Subsequently the use is prompted to enter or change each of the secondary carrier/classes. As discussed above, carrier/classes that are not represented by a specific key can be selected via a menu called by the CARR LOG key 104. The list thus selected is stored in NVM for use for carrier management. This part of the setup program also returns to the menu subroutine. Further menu selections enable exiting from the setup menu (choice 1) and printing out of the current AUTO-RATE SHOPPING lists.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a carrier management system including a scale for weighing parcels to be shipped, a computer connected to receive data from said scale related to the weight of a parcel thereon, and input means enabling an operator to input information to said computer, said input means including a plurality of keys including separate first input selection keys, the computer having a data base for storing shipping charge data for a plurality of shipping classes, based upon the weight of a parcel of said scale, said computer comprising means responsive to the operation of said first keys for determining shipping charges for predetermined shipping classes represented by data in said data base, the improvement wherein said input means further comprises an auto-rate selection key, and said computer comprises means responsive to operation of said auto-rate selection key for determining shipping charges of the least costly shipping class of a predetermined subgroup of shipping classes represented by data in said data base, and wherein said system further comprises means responsive to the depression of a determined key on said input means for determining the shipping charges for the next least costly shipping class of said subgroup.

2. The carrier management system of claim 1 further comprising a display connected to said computer, said computer comprising means responsive to operation of said auto-rate selection key for displaying the weight of a parcel on said scale, and the shipping charges for said parcel for said least costly shipping class, on said display.

3. The carrier management system of claim 1 further comprising printing means connected to said computer, for printing parcel shipping information, said computer comprising means responsive to the operation of a further key on said input means, following the operation of said auto-rate selection key, for controlling said printer to print parcel shipping information.

4. The carrier management system of claim 1 wherein said computer further comprises means responsive to the operation of determined keys of said input means for controlling the shipping classes within said subgroup.

5. The carrier management system of claim 1 wherein said system has a first mode wherein said computer comprises means responsive to the operation of said auto-rate selection key for permitting the determination only of the shipping charges of the least costly of said shipping classes of said subgroup, and a scroll mode wherein said computer comprises means responsive to the operation of said auto-rate selection key followed by operation of a further key for determining the next least costly shipping charge of said shipping classes of said subgroup.

6. The carrier management system of claim 5 wherein said computer comprises means responsive to operation of determined keys of said input means for selectively controlling said computer to operate in said first mode or said scroll mode.

* * * * *